(12) United States Patent
Greene

(10) Patent No.: US 8,332,442 B1
(45) Date of Patent: Dec. 11, 2012

(54) AUTOMATED RESTORATION OF LINKS WHEN RESTORING INDIVIDUAL DIRECTORY SERVICE OBJECTS

(75) Inventor: Christopher Greene, Longwood, FL (US)

(73) Assignee: Symantec Corporation, Mountain View, CA (US)

( * ) Notice: Subject to any disclaimer, the term of this patent is extended or adjusted under 35 U.S.C. 154(b) by 1167 days.

(21) Appl. No.: 11/527,146

(22) Filed: Sep. 26, 2006

(51) Int. Cl.
*G06F 17/30* (2006.01)
*G06F 17/00* (2006.01)

(52) U.S. Cl. ......... 707/828; 707/831; 719/316; 709/223

(58) Field of Classification Search .......... 707/204–206, 707/828, 831; 709/316, 227; 719/316
See application file for complete search history.

(56) References Cited

U.S. PATENT DOCUMENTS

2002/0178249 A1* 11/2002 Prabakaran et al. .......... 709/223
2005/0108190 A1* 5/2005 Conkel .............................. 707/1

OTHER PUBLICATIONS

"How to Restore Deleted User Accounts and Their Group Memberships in Active Directory," Article ID: 840001, Last Review: May 26, 2006, Revision: 4.0, © 2006 Microsoft Corporation, pp. 1-20, printed Sep. 14, 2006, http://support.microsoft.com/?kbid=840001.

Tony Murray, "Fun with Linked Attributes," created Jan. 29, 2006, updated Jan. 30, 2006, pp. 1-4, printed on Dec. 13, 2006, http://www.activedir.org/article.aspx?aid=92.
"User Object Properties," Source: http://msdn.microsoft.com/developer/windows2000/adsi/actdirguide_all., pp. 1-13, printed on Sep. 14, 2006, http://www.unav.es/cti/Idap-smb/AD-gluser.html.
"Features and Benefits," Quest Software, © 2006 Quest Software, Inc., pp. 1-2, printed on Sep. 14, 2006, http://www.quest.com/print/print.aspx?PageIndx=1377&cn=en-us&print=on,.
John Savill, "R2 Moves Window Server 2003 Forward" Nov. 29, 2005, Windows IT Pro, Dec. 2005 Edition, © 2006 Penton Media, Inc., pp. 1-6, printed on Sep. 14, 2006, http://www.windowsitpro.com/articles/print.cfm?articleid=48251.
"Active Directory Operations Guide, *Active Directory Backup and Restore*," Microsoft TechNet, pp. 1-14, © 2006 Microsoft Corporation, printed on Sep. 14, 2006, http://www.microsoft.com/technet/prodtechnol/windows2000server/technologies/activedirec . . . .
"Active Directory Disaster Recovery," Microsoft Windows 2000 Server *Operating System*, pp. 1-53, printed on Sep. 14, 2006, http:/windows.uswaterloo.ca/Server/Disaster/MS_docs/disaster.htm.

* cited by examiner

*Primary Examiner* — Yicun Wu
(74) *Attorney, Agent, or Firm* — Campbell Stephenson LLP

(57) ABSTRACT

Various methods and systems for automatically restoring links to a directory service's object when that object is restored from backup are disclosed. One method involves receiving user input selecting an individual directory service object for restoration from backup; restoring the directory service object from the backup; and automatically creating a forward link to the directory service object from a source object. The need to restore the forward link can be detected by either finding the forward link in a copy of the link table within the backup or finding a corresponding backward link in an attribute of a backed-up copy of the directory service object.

21 Claims, 4 Drawing Sheets

AUTOMATED RESTORATION OF LINKS WHEN RESTORING INDIVIDUAL DIRECTORY SERVICE OBJECTS

FIELD OF THE INVENTION

This invention relates to data protection and, more particularly, to restores of directory service objects from backup.

DESCRIPTION OF THE RELATED ART

Directory services organize and provide access to information about an organization's network resources, such as printers, services, and shared storage, as well as the users of those resources. The information accessed via a directory service provides an abstraction of certain resources and also indicates which users should be allowed to access which network resources, as well as what types of access are allowed. Administrators can use the directory service to configure the information in order to appropriately control user access to various network resources. Examples of directory services include Windows™ NT Directory Services, Active Directory for Windows 2000™, Lightweight Directory Access Protocol (LDAP), and Novell™ Directory Services.

The information maintained by a directory service can be stored in a database. Individual pieces of information are referred to as directory service objects, or simply objects. Certain objects may be related to other objects. For example, an object corresponding to a particular user can be related to another object that corresponds to a group in which the user is a member. The directory service can relate these two objects to each other using a special type of attribute called a "link." Each related object can contain a link to the other related object. For example, the group object can include a forward link, called "member," that points to the user object in order to identify that the user is a member of the group. Similarly, the user object can include a backward link, called "memberOf," that points to the group.

In order to protect directory service information against loss due to a failure or error, organizations often routinely create a backup copy of this information. If directory service information is lost (e.g., due to accidental deletion), the information can be restored from the backup copy. Typically, individual objects can be restored independently. However, if an object was linked to any other objects, simply restoring the object will not restore the links, since some links are attributes of objects other than the one being restored. For example, if a user object is restored, and that user object included a "memberOf" link to a group object, restoring the user object will not restore the corresponding "member" link in the group object. Accordingly, restoration of links to an individually-restored object has often required an administrator to manually recreate all of the links to that object from other objects. Since this process is inefficient and susceptible to errors, techniques for automatically restoring such links are desired.

SUMMARY

Various embodiments of methods and systems for automatically restoring links to a directory service's object when that object is restored from backup are disclosed. In one embodiment, a method involves receiving user input selecting an individual directory service object for restoration from backup; restoring the directory service object from the backup; and automatically creating a forward link to the directory service object from a source object. The need to restore the forward link can be detected by either finding the forward link in a copy of the link table within the backup or finding a corresponding backward link in an attribute of a backed-up copy of the directory service object.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
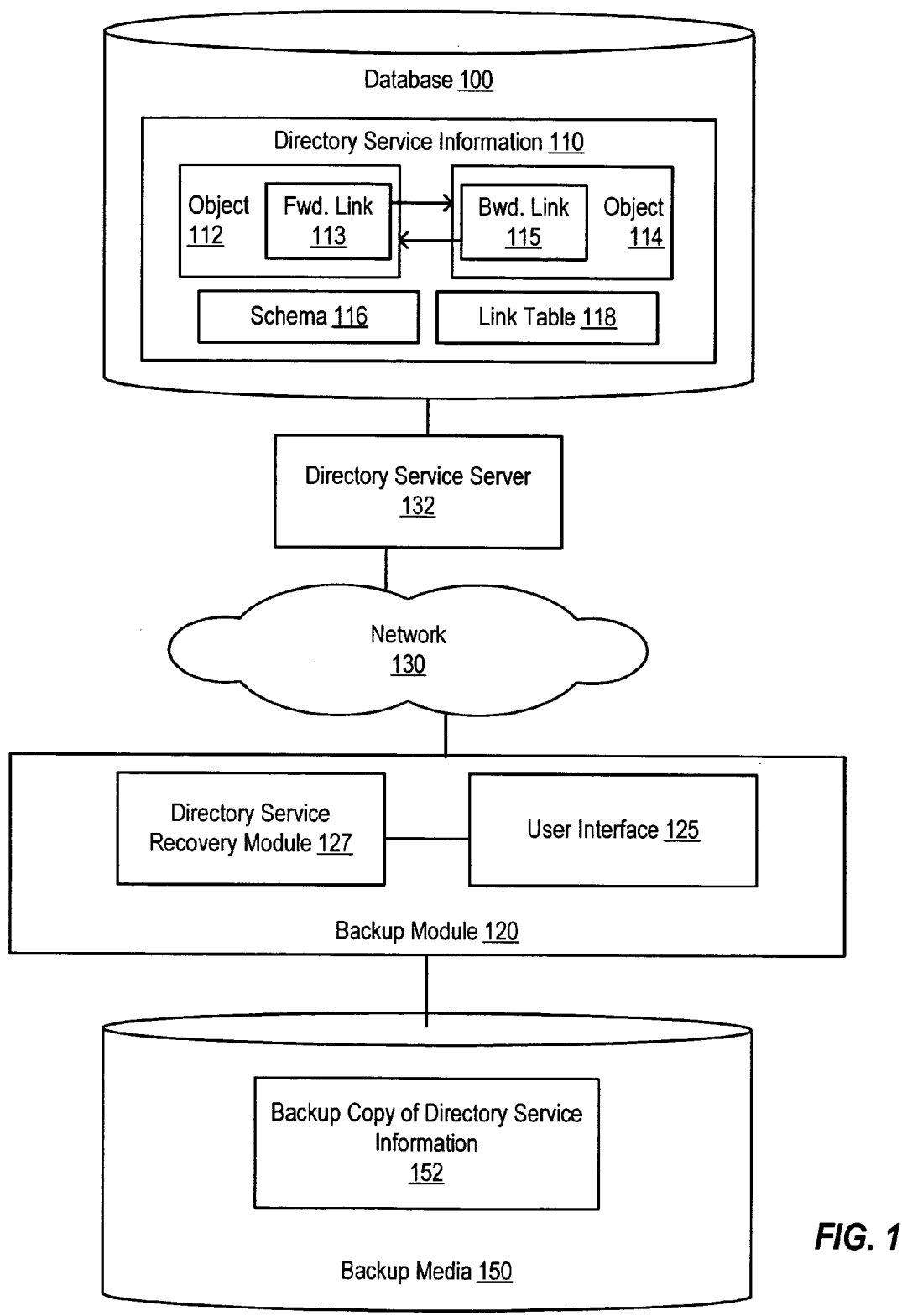
FIG. 1 is a block diagram of a system that performs backups and restores of directory service information, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a system that performs backups and restores of directory service information. As shown, a database 100 stores directory service information 110. In some embodiments, database 100 is a distributed database.

Directory service information 110 includes an object 112, which can have various attributes, including a forward ("Fwd.") link 113. Forward link 113 points to another object 114, which has a corresponding backward ("Bwd.") link 115 that identifies object 112. Object 114 is the target of forward link 113, and object 112 is the source of forward link 113. Similarly, object 112 is the target of backward link 115, and object 114 is the source of backward link 115. Directory service information 110 also includes special objects, such as a schema 116 and a link table 118.

Each link is a special type of attribute. Within an object, an attribute such as a link is identified by a name. For example, the identifier "memberOf" is the name of a backward link. Schema 116 can define each link and associate each link name with a unique identifier that is used to identify, among other things, whether the link is a forward or backward link as well as which the appropriate forward or backward link that corresponds to the link being defined. For example, the schema can associate name "memberOf" with link identifier "3". Within an object, each link attribute can have one or more values that identify the objects that are pointed to by the link. These values can be, for example, the distinguished names of the objects being pointed to.

Directory service clients can access directory service information 110 via a network 130 and a directory service server 132. Directory service server 132 supports a directory service such as Windows™ NT Directory Services, Active Directory for Windows 2000™, Windows™ Server 2003 Active Directory, Lightweight Directory Access Protocol (LDAP), and Novell™ Directory Services. Directory service server 132 acts as a database management system (DBMS) for database 100.

Backup module 120 includes a user interface 125 and a directory service recovery module 127. Backup module 120 is configured to create backup copies of information such as directory service information 110, to store those copies on backup media like backup media 150, and to restore that information from the backup copy, if requested by a user. In one embodiment, backup module 120 is implemented using Backup Exec™, available from Symantec Corp. of Cupertino, Calif. Backup module 120 can be implemented separately from (e.g., on a different computing device than) directory service server 132 in some embodiments. In other embodiments, backup module 120 can be implemented on the same computing device as directory service server 132.

Backup module 120 is coupled to backup media 150. Backup media 150 can include one or more tapes, hard drives, compact discs (CDs) or digital video discs (DVDs), and the like, as well as one or more arrays of individual storage devices (e.g., an optical storage jukebox, a "Just a Bunch of Disks" (JBOD) array, or a Redundant Array of Independent Disks (RAID) system). As shown, backup media 150 can store a backup copy 152 of directory service information 110. It is noted that multiple backup copies, each created at a different time and each thus storing a different version of directory service information 110, can be stored on backup media 150.

As noted above, backup module 120 includes user interface 125 and directory service recovery module 127. User interface 125 is configured to display information about backups to users. For example, user interface 125 can allow a user to browse information stored on one or more backup copies in order to select particular pieces of information for restoration. The information can identify the logical components included in the backup copy 152 of directory service information, and the logical components can be arranged in a logical view (e.g., a hierarchical tree-like structure) that corresponds to the arrangement of those components in the live set of directory service information 110. Thus, user interface 125 can display text and/or graphics corresponding to individual directory service objects, such as object 112 and 114, if those objects are included within backup copy 152. User interface 125 can obtain information about which logical components are included within backup copy 152 from, for example, prespecified organizational information that identifies how directory service information is organized as well as where different information in the directory service information hierarchy is located relative to the flat structure of the database storing the directory service information. This information can be used to determine which components are present in a given set of directory service information.

User interface 125 can also, in at least some embodiments, display additional information about individual objects. For example, user interface 125 can display attributes of an individual object to a user. In some situations, these attributes can be individually selected for restore. Thus, when a user selects a directory service object for restore, the user can select some, but not all, of the object's attributes for restore. Each attribute can be identified, for example, by displaying the name of that attribute to the user.

User interface 152 can also receive user input selecting one or more directory service objects (and/or their attributes) for restore. In response to receiving such input, user interface 125 notifies directory service recovery module 127. User interface 125 provides information identifying the selected object(s) and/or attribute(s) to directory service recovery module 127. Additionally, user interface 125 provides directory service recovery module 127 with information identifying the point in time from which the selected object should be restored. This timing information can be input directly by the user (e.g., by entering a time period) or indirectly (e.g., by selecting information from a particular backup copy, which was created at the point in time being selected).

Based on the information received via user interface 125, directory service recovery module 127 can restore one or more individual directory service objects. Directory service recovery module 127 reads each selected directory service object from the appropriate backup copy and then restores that directory service object to the live copy of directory service information 110.

In some embodiments, directory service recovery module 127 restores an object by restoring each of that object's attributes, one at a time, from a backup copy of the object to a live version of the object. Thus, directory service recovery module 127 can parse the backed-up copy of the object for each of the object's attributes. As each attribute is parsed, directory service recovery module 127 copies the value(s) of that attribute from backup copy 152 to the live copy of directory service information 110 in database 100. If the object to be restored is itself not present or enabled within the live copy of directory service information 110 when the restoration process begins, directory service recovery module 127 can provide the appropriate directory service commands to directory service server 132 to cause the object to be created and/or enabled within directory service information 110.

In some situations, restoration of a directory service object to a pre-existing state requires one or more objects, other than the one selected for restore, to be modified. Certain attributes, such as backward links, cannot be directly restored. Instead, such backward links need to be recreated by creating the corresponding forward link. For example, if the object being restored is a member of a group in the particular backup copy from which the object is being restored (e.g., as indicated by the object including a backward link to a group object), the group object may also need to be modified in order to establish that the object being restored is a member of the group.

In order to handle these situations, directory service recovery module 127 can use the directory service protocol to communicate commands to modify objects within directory service information 110 to directory service server 132. In particular, in order to restore forward links to an object (which can in turn restore the corresponding backward link attributes within the object), directory service recovery module 127 can generate requests to add attribute values, such as the identity (e.g., a distinguished name) of the object being restored, to a forward link attribute of another object. For example, some directory service protocols include an "add" command that allows a specified value to be added (without replacing or removing any existing values) to a specified attribute of a specified object. Thus, directory service recovery module 127 can, in some embodiments, use an "add" command to add the identity of the object being restored to a forward link attribute of another object.

In some embodiments, adding a forward link to the object being restored automatically causes a corresponding backward link attribute to be created within the object being restored (the value of the backward link attribute identifies the source object of the forward link). In certain situations, however, the backward link will not automatically be created (e.g., because the target object is not allowed to have backward links and/or because no backward link has been defined as corresponding to the forward link). More details regarding how directory service recovery module 127 can restore certain attributes are provided below in the descriptions of FIGS. 2 and 3.

Figure 2:
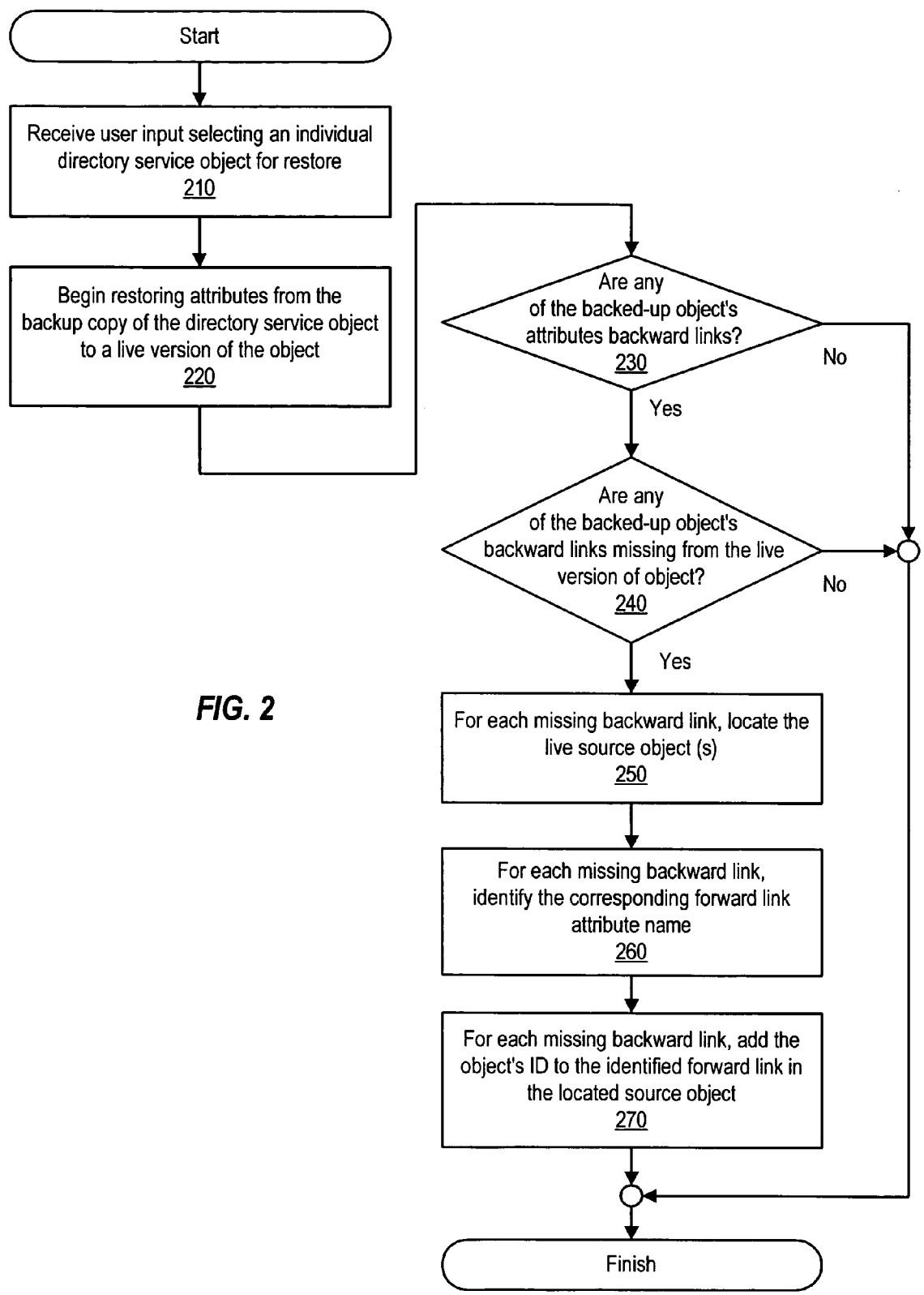
FIG. 2 is a flowchart of a method of restoring an individual directory service object, according to one embodiment of the present invention.

FIG. 2 is a flowchart of a method of restoring an individual directory service object. This method can be performed by a backup module such as backup module 120 of FIG. 1. In particular, operation 210 can be performed by user interface 125 and operations 220-270 can be performed by directory service recovery module 127. This particular method provides an example of a method in which forward links to an object can be restored based upon the presence of corresponding backward links within a backup copy of the object.

The method begins at 210, when user input selecting an individual directory service object for restore is received. The user input specifies the directory service object as well as a point in time from which the directory service object should be restored. This point in time identifies the particular backup copy from which the specified directory service object should be restored. In some embodiments, specific attributes of the directory service object are specified, allowing fewer than all of the attributes present in the backup copy to be restored.

At 220, the backup module begins restoring the attributes from the backup copy to the live version of the directory service object. In some embodiments, attributes are restored one at a time, while in other embodiments attributes are restored in parallel or without regard to whether a previous attribute has been fully restored.

If the backed-up copy of the directory service object (i.e., the version of the object present within the backup copy) has any backward link attributes, as shown at 230, these attributes will need to be restored by modifying an object other than the object being restored. The backup module can determine whether an object has any backward link attributes by accessing the backed-up copy of the link table (created during the same backup as the backed-up copy of the object being restored). The backup module can, in one embodiment, locate the backed-up copy link table within the backup information based upon prespecified organizational information that identifies the organization of directory service information.

The link table identifies all of the links present at the point in time at which the backup was created. For each link, the link table can identify a source, one or more targets, and the link identifier of the link attribute. If an entry within the backed-up link table indicates that the backed-up object is the source and/or target of any links, the backup module can obtain the corresponding link identifier from the entry. The backup module can then access the schema (in either the backup copy or the live copy) to obtain the attribute name corresponding to the link identifier found within the link table.

In some embodiments, each time the backup module encounters a new link identifier, the backup module can add that link identifier (and the corresponding attribute name found within the schema) to an index. The next time the backup module encounters that link identifier, the backup module can quickly determine the corresponding attribute name by accessing the index (instead of having to search the schema).

In some embodiments, the backup module determines whether an attribute is a backward link by looking up the definition of that attribute within the schema stored within the backup copy. If the schema defines the attribute to be a backward link (e.g., as determined by the link identifier of the attribute having an odd link identifier value, as described in more detail below), the backup module determines that the attribute is a backward link.

In response to detecting that the backed-up object includes backward links, the backup module can determine that one or more forward links to the object may need to be restored. It is noted that, if the user interface allows user selection of individual attributes, such forward links may only be restored if the user selects to restore the appropriate backward links within the backed-up object (e.g., unless the user has otherwise specified that all forward links targeting an object should always be restored if the object is restored). Additionally, it is noted that a given object can have multiple backward link attributes as well as multiple targets of each backward link (e.g., an object can have both "memberOf" and "directReports" backward link attributes, while also being a member of multiple different groups).

At 240, the backup module determines which, if any, of the forward links need to be restored by comparing the backward links present in the backup copy of the object to the backward links present in the live copy of the object. If all of the backward links are already present (i.e., if the same backward link attributes having the same respective link targets are present) in both the backup copy and the live copy, no further action is needed to restore the backward links. If, however, some backward links are present in the backup copy but are absent from the live copy, the backup module can perform operations 250-270 to restore those backward links.

At 250, the backup module locates the appropriate live source object for each backward link. Each backward link in the backup copy of the object has one or more targets, which are the source objects of the corresponding forward link (thus, the targets of a backward link are referred to as "source objects"). Each target is identified by an object identifier (e.g., a distinguished name). The backup module attempts to find each different backward link target within the backup copy of the object within the live copy of the directory service information. If some source objects are missing from the live copy of the directory service information, the backup module can display an error message to the user to indicate that the corresponding backward link cannot be restored.

At 260, the backup module identifies the corresponding forward link attribute name for each missing backward link within the live copy of the object being restored. The backup module can identify the forward link attribute name by first identifying the attribute identifier of the backward link within the object being restored.

Many directory service protocols define forward and backward links in pairs. The "definitions" of these links are contained within a special type of directory service object known as a schema (e.g., schema 116 of FIG. 1). Often, the attribute identifier of the backward link is derived from the attribute identifier of the forward link. For example, many directory service protocols assign even identifiers to forward links. The corresponding backward link is then the even identifier plus one. Thus, if the forward link "member" has attribute identifier "2," its corresponding backward link "memberOf" will have attribute identifier "3." Example link pairs (with each attribute's name in quotations and identifier in parentheses) include "member" (2) and memberOf" (3), "manager" (42) and "directReports (43), "owner" (44) and "ownerBL (45), and the like. Many different forward and backward link pairs can be predefined. Additionally, administrators are also free to define new link pairs by modifying the schema.

Based on the predefined relationship between forward and backward link attribute identifiers, the backup module can determine the attribute identifier of the corresponding forward link from the attribute identifier of a backward link within the backup copy of the object. For example, if a forward link attribute identifier is N (even) and the corresponding backward link attribute identifier is N+1 (odd), the backup module can identify the corresponding forward link attribute identifier by subtracting one from the backward link attribute identifier. Once the attribute identifier of the forward link has been determined, the backup module can determine the name of the forward link attribute by searching the schema in either the backup copy or the live copy for the attribute name corresponding to the attribute identifier.

In some embodiments, the backup module can maintain a list of link attribute identifiers and names in order to speed up this process. Whenever a new link attribute is identified, the backup module can store its name and attribute identifier in the list.

At 270, the backup module adds the identifier (e.g., a distinguished name) of the object being restored to the identified forward link (as identified using the attribute name of that forward link) within each located source object. The backup module can add these identifiers using specific directory service commands, such as "add" and "replace." It is noted that the source object being modified is present within the live copy of the directory service information. Creation of the forward link(s) causes the corresponding backward links (if defined and allowed within the target object) to be created.

Before performing operation 270, the backup module can, in some embodiments, access the schema (either within the backup copy or the live copy) to make sure that the desired operation to add the forward link can be performed on the located source object. Certain operations cannot be performed on certain source objects. If the schema indicates that the operation cannot be performed on the source object, the backup module can display an error message to the user, indicating that the forward link cannot be restored.

It is noted that operations 250 and 260 can be performed at the same time (at least in part) or in a different order than is shown in FIG. 2. For example, the backup module can identify the corresponding forward link attribute identifier(s) prior to identifying the live source object(s). Similarly, other operations of FIG. 2 can be performed in different orders and/or omitted. Other operations can be performed in addition to and/or instead of those operations shown in FIG. 2.

Figure 3:
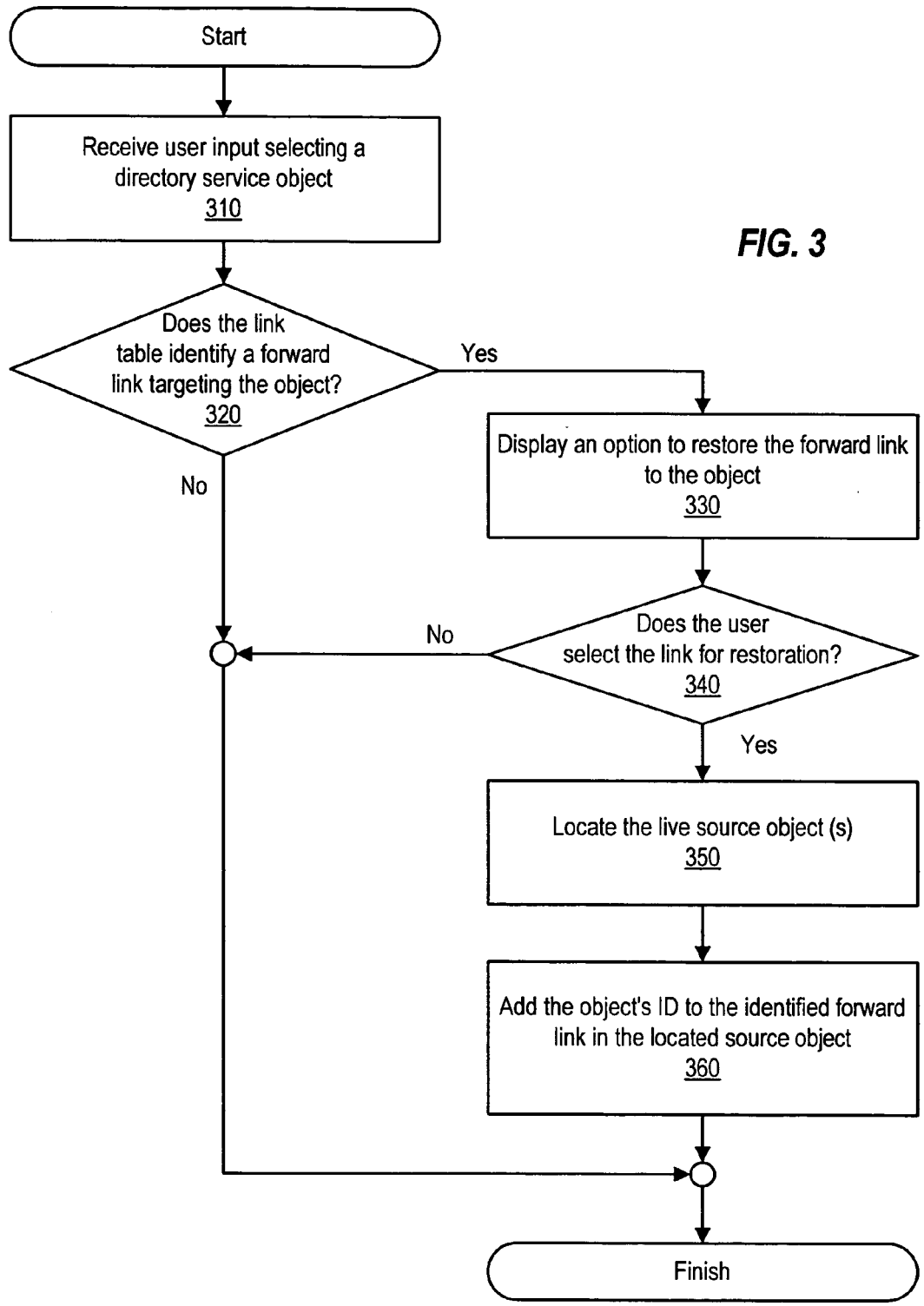
FIG. 3 is a flowchart of another method of restoring an individual directory service object, according to one embodiment of the present invention.

FIG. 3 is a flowchart of another method of restoring an individual directory service object. FIG. 3 can be used to handle situations in which an object to be restored is linked to by another object but does not itself contain a corresponding backward link. FIG. 3 can be performed by a backup module such as backup module 120 of FIG. 1. In particular, operations 310 and 330 can be performed by user interface 125 and operations 320 and 340-360 can be performed by directory service recovery module 127.

It is possible for administrators to define forward links that do not have corresponding backward links by simply omitting to add the definition of the corresponding backward link to the schema. Such an omission could be accidental or intentional. Additionally, in certain situations, it may be possible for a forward link to identify a particular target object, even though the target object is a type of object that is not allowed to have a corresponding backward link. Thus, in certain situations, an object can be the target of a forward link without itself having a corresponding backward link.

In order to handle situations in which a backed-up object is targeted by a forward link but does not have a corresponding backward link, the backup module can access the link table provided by the directory service and use the information contained within the link table to determine whether a particular object is the target of any forward links.

The method begins when a user selects a backup copy of a directory service object, as shown at 310. In this example, when a user selects a backup copy of a directory service object, the backup module displays all of the object's attributes to the user, allowing the user to select individual attributes for restoration.

When the user selects the object (which can be based on either the user selecting the individual object or the user selecting a view of a group of objects that includes the individual object), the backup module accesses a link table (e.g., link table 118 of FIG. 1) within the particular backup copy being browsed by the user. The backup module then searches the link table for any links that target the selected object. The backup module can search the link table by searching for an identifier (e.g., a distinguished name or numerical identifier) that identifies the object within the link table. If a forward link to the selected object is found, the backup module can display an option to restore the corresponding forward link to the object, as shown at 320 and 330. Operations 320 and 330 can be repeated for each different forward link to the object.

If a user selects the link for restoration (e.g., by selecting the option corresponding to the forward link), as determined at 340, the backup module can begin recreating the forward link. Initially, if the object being restored is not present or enabled within the live copy of the directory service information, the backup module can create and/or enable the object. This may involve copying information from the backup copy of the object to the live copy of the directory service information.

Then, the backup module locates the source object of the forward link within the live copy of the directory service information. The source object can be identified from the link table (e.g., the backup module can keep track of the source of each forward link to the object being restored as well as the attribute identifier of each forward link found when the backup module searches for forward links targeting the object). If the source object is present within the live copy of the directory service information, the backup module can recreate the forward link; otherwise, the backup module cannot restore the link and can display an error message to the user.

If the source object has been located within the live copy of the directory service information, the backup module can then recreate the forward link by adding information (e.g., a distinguished name) identifying the object to the appropriate forward link attribute (as identified in the link table and schema) of the source object, as shown at 360. The backup module can add the information using an appropriate set of one or more directory service commands. It is noted that the backup module can verify that the forward link is not already present within the live copy of the directory service information before attempting to recreate the forward link. Operations 320-360 can be repeated for each different link to the object identified within the link table.

As in FIG. 2, the operations of FIG. 3 can be performed in different orders and/or omitted. Other operations can be performed in addition to and/or instead of those operations shown in FIG. 3.

While the above description focuses on how the method of FIG. 3 can be used to restore forward links when no corresponding backward links are present, it is noted that the method of FIG. 3 can also be used to restore forward links when corresponding backward links are present within the object being restored. For example, instead of identifying forward links to restore based on the presence of backward links within the object to be restored (as shown in the method of FIG. 2), the backup module can identify forward links to restore based upon the presence of forward links to the object.

Furthermore, although the particular method shown in FIG. 3 displays all available attributes of the object to restore, including forward links that target the object, even when the object does not include corresponding backward links, other embodiments can allow such forward links to be restored without necessarily displaying those links to a user. For example, in some embodiments, all forward links are automatically restored if the user selects the object for restoration. In these embodiments, the user does not need to select anything other than the object itself to restore the forward links. In other embodiments, the user can specify certain options that apply to all object restores. For example, user-selectable options can include "always restore forward links," "never restore forward links," or "display forward links for restore selection." Depending upon which option is selected, the backup module can (1) always restore forward links to an object when the object is selected for restore (without necessarily displaying options corresponding to those forward links to the user), (2) never restore forward links to an object when the object is selected for restore (again, without necessarily displaying any options corresponding to those forward links), or (3) always display the forward links, and selectively restore links based upon whether the user has selected those links for restoration.

Figure 4:
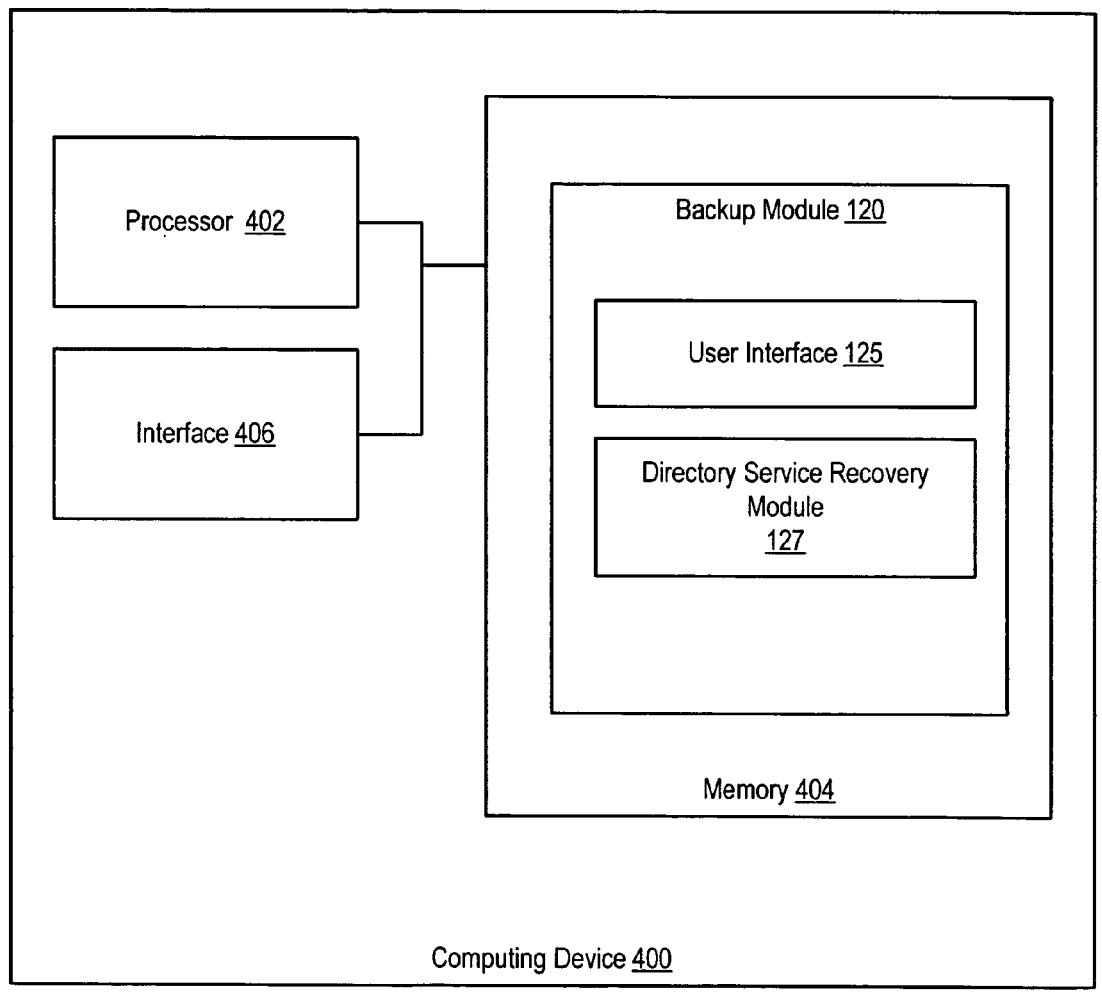
FIG. 4 is a block diagram of a computing device that implements a backup module that can restore individual directory service objects, according to one embodiment of the present invention.

FIG. 4 is a block diagram of a computing device 400 that implements a backup module that can restore individual directory service objects. FIG. 4 illustrates how certain elements of backup module 120 can be implemented in software. Computing device 400 can be a personal computer, server, personal digital assistant, mobile phone, storage controller (e.g., an array controller, tape drive controller, or hard drive controller), or the like.

As illustrated, computing device 400 includes one or more processors 402 (e.g., microprocessors, PLDs (Programmable Logic Devices), or ASICs (Application Specific Integrated Circuits)) configured to execute program instructions stored in memory 404. Memory 404 can include various types of RAM (Random Access Memory), ROM (Read Only Memory), Flash memory, MEMS (Micro Electro-Mechanical Systems) memory, magnetic core memory, and the like. Memory 404 can include both volatile and non-volatile memory. Computing device 400 also includes one or more interfaces 406. Processor 402, interface 406, and memory 404 are coupled to send and receive data and control signals by a bus or other interconnect.

Interface 406 can include a network interface to various networks and/or interfaces to various peripheral buses. For example, interface 406 can include a network interface that allows backup module 120 to communicate with a directory service server. Thus, interface 406 can include an interface to a network, such as network 130 of FIG. 1. Interface 406 can also include an interface to one or more storage devices (e.g., backup media 150 of FIG. 1). Thus, backup module 120 can access backed-up directory service information via interface 406.

In this example, program instructions and data executable to implement all or part of backup module 120 functionality, including user interface 125 and directory service recovery module 127, are stored in memory 404. The program instructions and data implementing backup module 120 can be stored on various computer readable media such as memory 404. In some embodiments, such software is stored on a computer readable medium such as a CD (Compact Disc), DVD (Digital Versatile Disc), hard disk, optical disk, tape device, floppy disk, and the like). In order to be executed by processor 402, the instructions and data can be loaded into memory 404 from the other computer readable medium. The instructions and/or data can also be transferred to computing device 400 for storage in memory 404 via a network such as the Internet or upon a carrier medium.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving user input selecting an individual directory service object for restoration from backup;
detecting that the backup comprises one or more forward links to the individual directory service object from one or more other backed up directory service objects;
restoring the individual directory service object from the backup to a live set of directory services information, wherein the live set of directory service information comprises the restored individual directory service object, a schema, and a second directory service object;
automatically initiating, using a processor, modification of an attribute of the second directory service object to include a value identifying the restored individual directory service object, in response to the detecting, wherein the schema defines the attribute to be a forward link, and wherein the modification of the forward link indicates that the restored individual directory service object is related to the second directory service object.

2. The method of claim 1, further comprising:
displaying a plurality of options corresponding to the individual directory service object, wherein
the plurality of options comprises a link attribute option; and
the user input comprises user selection of the link attribute option.

3. The method of claim 2, further comprising:
searching a link table in the backup for any links that specify the individual directory service object; and
displaying the link attribute option in response to finding a link that specifies the individual directory service object in the link table.

4. The method of claim 1, further comprising:
locating the second directory service object within the live set of directory service information.

5. The method of claim 1, further comprising:
identifying the forward link, wherein the identifying comprises modifying a value identifying a backward link.

6. The method of claim 1, further comprising:
initiating, in response to the modification of the attribute of the second directory service object, modification of a corresponding attribute of the restored individual directory service object to include a value identifying the second directory service object, wherein the modification of the value of the attribute of the second directory service object enables the modification of the corresponding attribute of the restored individual directory service object, and wherein the schema defines the corresponding attribute to be a backward link.

7. A computer readable storage medium tangibly embodying program instructions executable to:
receive user input selecting an individual directory service object for restoration from backup;

detect that the backup comprises one or more forward links to the individual directory service object from one or more other backed up directory service objects;
restore the individual directory service object from the backup to a live set of directory services information, wherein the live set of directory service information comprises the restored individual directory service object, a schema, and a second directory service object; and
automatically initiate modification of an attribute of the second directory service object to include a value identifying the restored individual directory service object, in response to detection of the backup comprising the one or more forward links to the individual directory service object, wherein the schema defines the attribute to be a forward link, and wherein the modification of the forward link indicates that the restored individual directory service object is related to the second directory service object.

8. The computer readable storage medium of claim 7, wherein the program instructions are further executable to:
display a plurality of options corresponding to the individual directory service object, wherein
the plurality of options comprises a link attribute option; and
the user input comprises user selection of the link attribute option.

9. The computer readable storage medium of claim 8, wherein the program instructions are further executable to:
search a link table in the backup for any links that specify the individual directory service object; and
display the link attribute option in response to finding a link that specifies the individual directory service object in the link table.

10. The computer readable storage medium of claim 7, wherein the program instructions are further executable to:
locate the second directory service object within the live set of directory service information.

11. The computer readable storage medium of claim 7, wherein the program instructions are further executable to:
identify the forward link by modifying a value identifying a backward link.

12. A system comprising:
a processor; and
a memory coupled to the processor, wherein the memory stores program instructions executable to:
receive user input selecting an individual directory service object for restoration from backup;
detect that the backup comprises one or more forward links to the individual directory service object from one or more other backed up directory service objects;
restore the individual directory service object from the backup to a live set of directory services information, wherein the live set of directory service information comprises the restored individual directory service object, a schema, and a second directory service object; and
automatically initiate modification of an attribute of the second directory service object to include a value identifying the restored individual directory service object, in response to detection of the backup comprising the one or more forward links to the individual directory service object, wherein the schema defines the attribute to be a forward link, and wherein the modification of the forward link indicates that the restored individual directory service object is related to the second directory service object.

13. The system of claim 12, wherein the program instructions are further executable to:
display a plurality of options corresponding to the individual directory service object, wherein
the plurality of options comprises a link attribute option; and
the user input comprises user selection of the link attribute option.

14. The system of claim 13, wherein the program instructions are further executable to:
search a link table in the backup for any links that specify the individual directory service object; and
display the link attribute option in response to finding a link that specifies the individual directory service object in the link table.

15. The system of claim 12, wherein the program instructions are further executable to:
locate the second directory service object within the live set of directory service information.

16. The system of claim 12, wherein the program instructions are further executable to:
identify the forward link by modifying a value identifying a backward link.

17. A system comprising:
computer readable storage means for storing a backup;
means for receiving user input selecting an individual directory service object for restoration from the backup;
means for detecting that the backup comprises one or more forward links to the individual directory service object from one or more other backed up directory service objects;
means for restoring the individual directory service object from the backup to a live set of directory services information, wherein the live set of directory service information comprises the restored individual directory service object, a schema, and a second directory service object; and
means for automatically initiating modification of an attribute of the second directory service object to include a value identifying the restored individual directory service object, in response to detection of the backup comprising the one or more forward links to the individual directory service object, wherein the schema defines the attribute to be a forward link, and wherein the modification of the forward link indicates that the restored individual directory service object is related to the second directory service object.

18. The system of claim 17, further comprising:
means for displaying a plurality of options corresponding to the individual directory service object, wherein
the plurality of options comprises a link attribute option; and
the user input comprises user selection of the link attribute option.

19. The system of claim 18, further comprising:
means for searching a link table in the backup for any links that specify the individual directory service object; and
means for displaying the link attribute option in response to finding a link that specifies the individual directory service object in the link table in the backup.

20. The system of claim 18, further comprising:
means for locating the second directory service object within the live set of directory service information.

21. The system of claim 17, further comprising:
means for identifying the forward link, wherein the identifying comprises modifying a value identifying a backward link.

* * * * *

UNITED STATES PATENT AND TRADEMARK OFFICE
CERTIFICATE OF CORRECTION

PATENT NO. : 8,332,442 B1  
APPLICATION NO. : 11/527146  
DATED : December 11, 2012  
INVENTOR(S) : Christopher Greene Page 1 of 1

It is certified that error appears in the above-identified patent and that said Letters Patent is hereby corrected as shown below:

On the cover page item (73) the Assignee should read as follows:

Assignee: Symantec Operating Corporation  
Mountain View, California (US)

Signed and Sealed this  
Twenty-sixth Day of March, 2013

Teresa Stanek Rea  
*Acting Director of the United States Patent and Trademark Office*